United States Patent
Yang et al.

(10) Patent No.: US 12,096,271 B2
(45) Date of Patent: Sep. 17, 2024

(54) METHODS FOR SERVICE TRANSMISSION, CORE NETWORK DEVICE, AND ACCESS NETWORK DEVICE

(71) Applicant: GUANGDONG OPPO MOBILE TELECOMMUNICATIONS CORP., LTD., Guangdong (CN)

(72) Inventors: Haorui Yang, Guangdong (CN); Jianhua Liu, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 351 days.

(21) Appl. No.: 17/563,166

(22) Filed: Dec. 28, 2021

(65) Prior Publication Data

US 2022/0124550 A1 Apr. 21, 2022

Related U.S. Application Data

(63) Continuation of application No. PCT/CN2020/072294, filed on Jan. 15, 2020.

(51) Int. Cl.
*H04W 28/02* (2009.01)
*H04W 76/10* (2018.01)

(52) U.S. Cl.
CPC ....... *H04W 28/0268* (2013.01); *H04W 76/10* (2018.02)

(58) Field of Classification Search
CPC ............. H04W 28/0268; H04W 76/10; H04W 28/0263; H04W 28/0925; H04W 76/11; H04W 76/12
See application file for complete search history.

(56) References Cited

U.S. PATENT DOCUMENTS

| 2019/0124181 A1* | 4/2019 | Park ...................... H04W 36/08 |
| 2019/0215693 A1 | 7/2019 | Lee et al. |
| 2019/0222489 A1 | 7/2019 | Shan |

(Continued)

FOREIGN PATENT DOCUMENTS

| CN | 109769150 | 5/2019 |
| CN | 110167190 | 8/2019 |

(Continued)

OTHER PUBLICATIONS

3GPP, "Study on Architectural enhancements for 5G multicast-broadcast services", Technical Specification Group Services and System Aspects, 3GPP TR 23.757, Release 17, Nov. 2019.

(Continued)

*Primary Examiner* — Kibrom T Hailu
(74) *Attorney, Agent, or Firm* — Hodgson Russ LLP (57) ABSTRACT

Methods for service transmission, a core network device, and an access network device are provided. The method includes obtaining, by a core network device, a QoS profile for transmitting the unicast service and/or the multicast service, and transmitting, by the core network device, the QoS profile to the access network device. The unicast service and the multicast service are transmitted through the same PDU session. The QoS profile is used for the access network device to transmit a target service.

20 Claims, 5 Drawing Sheets

(56) References Cited

U.S. PATENT DOCUMENTS

2021/0234717 A1* 7/2021 Speicher ............ H04W 36/0016
2022/0006563 A1* 1/2022 Navrátil .................. H04L 47/15
2022/0313375 A1* 10/2022 Zhang .................. A61B 1/2676

FOREIGN PATENT DOCUMENTS

| CN | 110557724 | 12/2019 |
| CN | 110662270 | 1/2020 |
| EP | 3700223 | 8/2020 |
| WO | 2021142669 | 7/2021 |

OTHER PUBLICATIONS

Huawei et al., "Clarification of SMF management of 5GLAN PDU sessions", 3GPP TSG-WG SA2 Meeting #136, 62-1911595, Nov. 2019.
CATT, "TS 23.287 PC5 QoS handling for unicast, groupcast and broadcast", SA WG2 Meeting #133, S2-1905404, May 2019.
WIPO, International Search Report for International Application No. PCT/CN2020/072294, Oct. 10, 2020.
EPO, Communication for EP Application No. 20913705.8, Mar. 22, 2023.
Nokia et al., "PDU session enhanced for multicast to provide the basic multicast connectivity service," SA WG2 Meeting #S2-136, S2-1911366, Nov. 2019.
CNIPA, First Office Action for CN Application No. 202210012892. 1, Apr. 20, 2023.
EPO, Extended European Search Report for EP Application No. 20913705.8, Jul. 25, 2022.

* cited by examiner

METHODS FOR SERVICE TRANSMISSION, CORE NETWORK DEVICE, AND ACCESS NETWORK DEVICE

CROSS-REFERENCE TO RELATED APPLICATION (S)

This application is a continuation of International Application No. PCT/CN2020/072294, filed on Jan. 15, 2020, the entire disclosure of which is incorporated herein by reference.

TECHNICAL FIELD

Implementations of this disclosure relates to the communication field, and in particular to methods for service transmission, a core network device, and an access network device.

BACKGROUND

Service transmission can be performed between an access network device and a terminal device via unicast or multicast. On condition that a unicast service and a multicast service of the terminal device can be transmitted through a same protocol data unit (PDU) session, how can the access network device effectively perform service transmission and ensure quality of service (QoS) requirements have become an urgent problem to be solved.

SUMMARY

In a first aspect, a method for service transmission is provided. The method includes the following. A core network device obtains a quality of service (QoS) profile for transmitting a unicast service and/or a multicast service. The unicast service and the multicast service are transmitted through a same protocol data unit (PDU) session. The core network device transmits the QoS profile to an access network device. The QoS profile is used for the access network device to transmit a target service.

In a second aspect, a method for service transmission is provided. The method includes the following. An access network device receives a QoS profile from a core network device. The QoS file is used for transmitting a unicast service and/or a multicast service. The unicast service and the multicast service are transmitted through a same PDU session. The access network device transmits a target service according to the QoS profile.

In a third aspect, a core network device is provided. The core network device includes a transceiver, a processor, and a memory storing a computer program which, when executed by the processor, causes the processor to obtain a QoS profile for transmitting a unicast service and/or a multicast service, where the unicast service and the multicast service are transmitted through a same PDU session. The computer program, when executed by the processor, causes the transceiver to transmit the QoS profile to an access network device, the QoS profile being used for the access network device to transmit a target service.

In a fourth aspect, an access network device is provided. The access network device includes a transceiver, a processor, and a memory storing a computer program which, when executed by the processor, causes the transceiver to receive, from a core network device, a QoS profile for transmitting a unicast service and/or a multicast service, and transmit a target service according to the QoS profile, where the unicast service and the multicast service are transmitted through a same PDU session.

DETAILED DESCRIPTION

In the following, technical solutions in implementations of the present disclosure will be described in conjunction with accompany drawings.

The technical solutions in the implementations of the present disclosure may be applied to various communication systems, such as: a long term evolution (LTE) system, an LTE frequency division duplex (FDD) system, an LTE time division duplex (TDD) system, an advanced long term evolution (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a future fifth generation (5G) system, or other communication systems.

Figure 1:
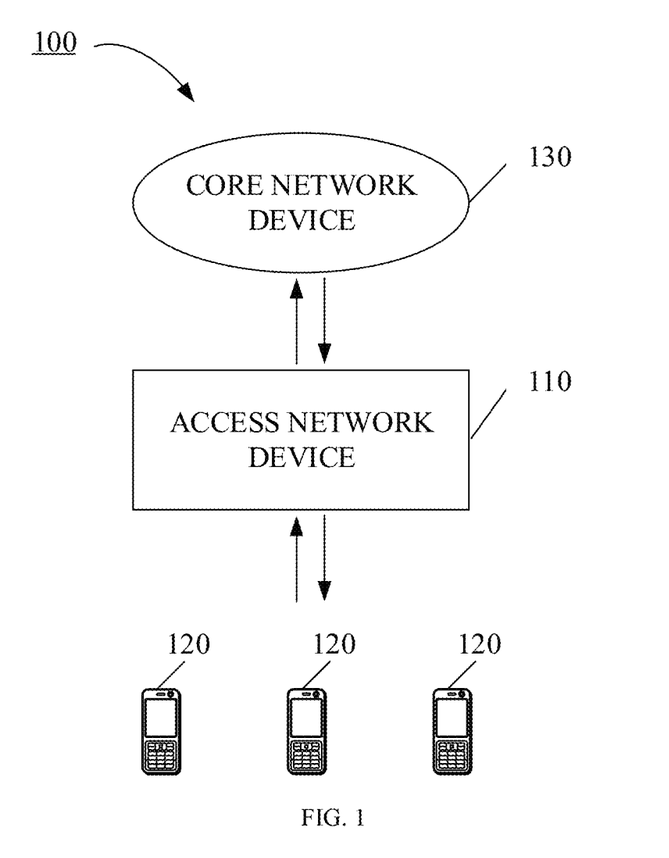
FIG. 1 is a schematic diagram illustrating a wireless communication system according to implementations of the present disclosure.

FIG. 1 is a schematic diagram illustrating a wireless communication system according to implementations of the present disclosure. The wireless communication system 100 may include an access network device 110. The access network device 110 can communicate with a terminal device.

The access network device 110 may provide communication coverage for a specific geographic area, and may communicate with a terminal device located within the coverage area. The access network device 110 may be an evolved node B (eNB or eNodeB) in the LTE system or a radio controller in a cloud radio access network (CRAN). Alternatively, the access network device 110 may be a relay station, an access point, an in-vehicle device, a wearable device, a future network-side device, a network device in a future evolved public land mobile network (PLMN), etc.

The communication system 100 may further include at least one terminal device 120 located within the coverage area of the access network device 110. The terminal device 120 may be mobile or fixed. In an example, the terminal device 120 may refer to user equipment (UE), an access terminal, a subscriber unit, a subscriber station, a mobile station, a remote station, a remote terminal, a mobile device, a user terminal, a terminal, a wireless communication device, a user agent, or a user device. The terminal device may also be a cellular phone, a cordless phone, a session initiation protocol (SIP) phone, a wireless local loop (WLL) station, a personal digital assistant (PDA), a handheld device with a wireless communication function, a computing device, other processing devices connected to wireless modems, an in-vehicle device, a wearable device, a terminal device in a future 5G network, or a terminal device in the PLMN, which is not limited herein. In one example, device to device (D2D) communication may be performed between the terminal devices 120.

The communication system 100 may further include a core network device 130 that can communicate with the access network device 110. The core network device 130 may be a core network device in a 5G system, such as an access and mobility management function (AMF), a session management function (SMF), a user plane function (UPF), a policy control function (PCF), etc. Alternatively, the core network device 130 may also be a core network device in the LTE system or other systems.

FIG. 1 exemplarily illustrates one access network device, one core network device, and three terminal devices, but the present disclosure is not limited to this. The wireless communication system 100 may also include multiple core network devices, or multiple access network devices, and there may be other numbers of terminal devices within the coverage area of each access network device, which is not limited herein.

The core network device may transmit a quality of service (QoS) profile to the access network device. The QoS profile may include a QoS parameter used for transmitting service data, and other related information. For example, the QoS profile may include a 5G quality of service identifier (5QI), a guaranteed bit rate (GBR), a maximum bit rate (MBR), an allocation and retention priority (APR), and other parameters.

A unicast service and a multicast service of the terminal device may be transmitted through a same PDU session. In this case, the access network device may determine whether a current QoS flow corresponds to the unicast service or the multicast service, and obtain a corresponding QoS profile, so as to effectively perform service transmission and ensure QoS requirements of the unicast service and multicast service transmitted.

Implementations of the present disclosure provide a method for service transmission. In case that the unicast service and the multicast service of the terminal device may be transmitted through the same PDU session, the access network device can effectively perform service transmission and ensure QoS requirements.

Figure 2:
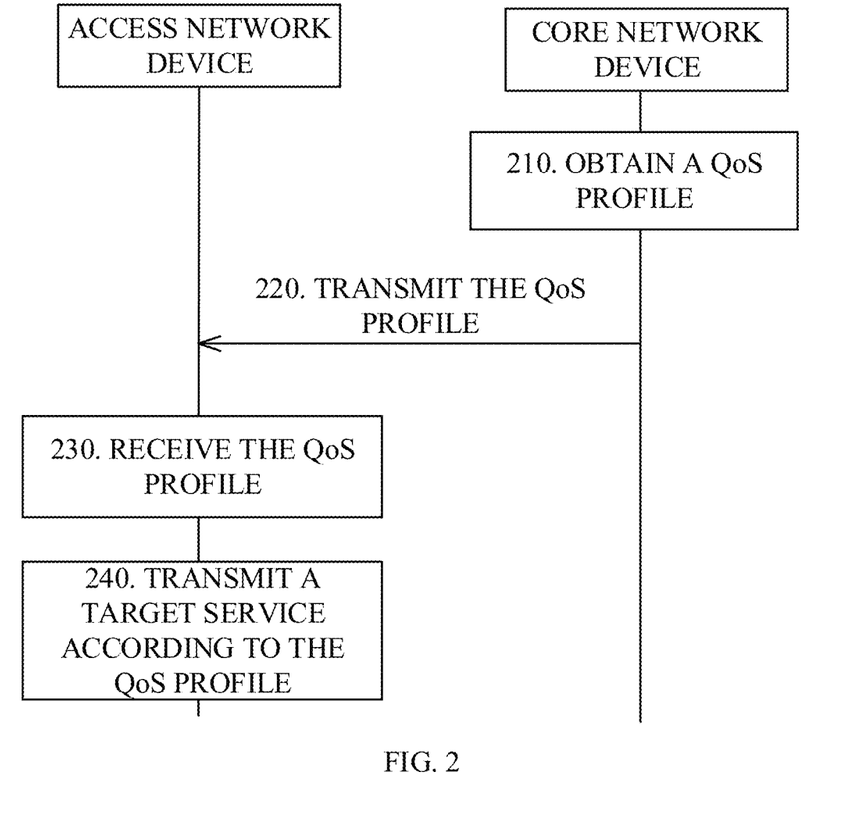
FIG. 2 is an interaction flow chart illustrating a method for service transmission according to implementations of the present disclosure.

FIG. 2 is a schematic flow chart illustrating a method for service transmission according to implementations of the present disclosure. As illustrated in FIG. 2, the method is performed by a core network device and an access network device. The core network device may be a core network element such as an SMF, an AMF, etc. The access network device may be, for example, various base stations described above. As illustrated in FIG. 2, the method may include all or part of the following operations.

At 210, the core network device obtains a QoS profile.

At 220, the core network device transmits the QoS profile to the access network device.

At 230, the access network device receives the QoS profile from the core network device.

At 240, the access network device transmits a target service according to the QoS profile.

The QoS profile is used for transmitting a unicast service and/or a multicast service. The unicast service and the multicast service are transmitted through a same PDU session.

At 210, the core network device, such as the SMF, may obtain the QoS profile according to local configuration, or obtain the QoS profile from a PCF. The access network device may obtain the QoS profile in response to the following events. For example, when a terminal device joins multicast service transmission, the terminal device transmits a PDU session establishment/modification request message to the SMF, and in this case the access network device may obtain the QoS profile. For another example, when an existing QoS parameter changes, the PCF updates the QoS profile, and in this case the access network device may obtain the QoS profile. For yet another example, when the local configuration used by the SMF changes, the SMF triggers update of the QoS profile, and in this case the access network device may obtain the QoS profile.

After obtaining the QoS profile, the SMF may transmit, through the AMF, an identifier of the terminal device (UE ID), an identifier of the PDU session, and the QoS profile to the access network device. It can be understood that the QoS profile includes a QoS parameter used for transmitting the unicast service and/or the multicast service. The QoS parameter may also be referred to as a QoS flow parameter, for example, including a 5QI, a GBR, an MBR, an APR, etc. The ARP may be used for the access network device to determine whether a resource for the unicast service can be preempted by the multicast service. For example, a higher value of the ARP represents a higher priority of a corresponding service. In case that the access network device has insufficient resources, a service with a higher priority may preempt a resource for a service with a lower priority. The ARP corresponding to the multicast service being relatively high means that in case that the access network device has insufficient resources, to transmit the multicast service, the multicast service may preempt a resource used by the unicast service.

In the implementations of the present disclosure, the unicast service and the multicast service may be transmitted using a same QoS flow or different QoS flows in the PDU session. In the following, these two cases will be described respectively in conjunction with FIG. 3 and FIG. 4.

Case 1

The unicast service and the multicast service are transmitted using the same QoS flow in the PDU session.

In this case, the QoS profile may be in the following two forms.

1) The QoS profile includes a first QoS profile and a second QoS profile.

The first QoS profile is used for transmitting the unicast service. The second QoS profile is used for transmitting the multicast service.

It can be understood that the first QoS profile has multiple parameters each with a parameter value close to a parameter value of a same parameter in the second QoS profile.

Since QoS requirements of the unicast service and the multicast service corresponding to the QoS flow are the same or close, a parameter value of a QoS parameter corresponding to the unicast service and a parameter value of a same QoS parameter corresponding to the multicast service are the same or close. "Close" may represent that a difference between parameter values is not greater than a threshold. For example, a difference between a value of the 5QI corresponding to the unicast service and a value of the 5QI corresponding to multicast service is less than a threshold.

In the implementation, since the target service of the terminal device may be transmitted via unicast or multicast, the core network device configures a group of QoS parameters for the unicast service and a group of QoS parameters for the multicast service. The group of QoS parameters for the unicast service are carried in the first QoS profile, and the group of QoS parameters for the multicast service are carried in the second QoS profile. If the target service is the unicast service, the target service is transmitted between the access network device and the terminal device using the QoS parameters in the first QoS profile. If the target service is the multicast service, the access network device uses the QoS parameters in the second QoS profile to transmit the target service to the terminal device.

In an implementation, the first QoS profile includes a unicast indication information indicative of that the first QoS profile is used for transmitting the unicast service. The second QoS profile includes a multicast indication information indicative of that the second QoS profile is used for transmitting the multicast service.

As an example, the QoS profile is illustrated in Table 1. The QoS profile includes the first QoS profile and the second QoS profile. Parts in bold are newly added. The first QoS profile carries the unicast indication information indicating that the first QoS profile is used for transmitting the unicast service. The second QoS profile carries the multicast indication information indicating that the second QoS profile is used for transmitting the multicast service. Only names of items in the QoS profile are listed in Table 1, and specific values of respective items are omitted. Since the unicast service and the multicast service are transmitted using a same QoS flow, a QoS flow indicator (QFI) in the first QoS profile has a same value as a QFI in the second QoS profile.

In an implementation, as illustrated in Table 1, the second QoS profile further includes a service identifier of the multicast service. In case that a same multicast service corresponds to multiple PDU sessions for multiple terminal devices, by means of a multicast service identifier in the second QoS profile, the access network device may know that in the multiple PDU sessions certain QoS flows correspond to the same multicast service, so that the access network device may broadcast data of the multicast service to the terminal device only once, and discard repeated data.

TABLE 1

| First QoS profile | QoS flow establishment request list |
| --- | --- |
| | > QoS flow establishment request item |
| | >> QFI |
| | >> QoS flow level and QoS parameter |
| | >> evolved radio access bearer (E-RAB) identifier |
| | >> unicast indication information |
| Second QoS profile | QoS flow establishment request list |
| | > QoS flow establishment request item |
| | >> QFI |
| | >> QoS flow level and QoS parameter |
| | >> E-RAB identifier |
| | >> multicast indication information |
| | >> multicast service identifier |

In another implementation, a name of the first QoS profile is different from a name of the second QoS profile.

That is, which of the first QoS profile and the second QoS profile is used for transmitting unicast data and which is used for transmitting multicast data is determined according to the names of the first QoS profile and the second QoS profile.

In this case, the unicast indication information and the multicast indication information may be omitted.

As an example, the QoS profile is illustrated in Table 2. The QoS profile includes the first QoS profile and the second QoS profile. Parts in bold are newly added. The name of the first QoS profile is QoS flow establishment request item of unicast service, and the name of the second QoS profile is QoS flow establishment request item of multicast service. Only names of items in the QoS profile are listed in Table 2, and specific values of respective items are omitted. Similar to Table 1, the QFI in the first QoS profile has the same value as the QFI in the second QoS profile. The second QoS profile further includes the service identifier of the multicast service.

TABLE 2

| First QoS profile | QoS flow establishment request list |
| --- | --- |
| | > QoS flow establishment request item of unicast service |
| | >> QFI |
| | >> QoS flow level and QoS parameter |
| | >> E-RAB identifier |
| Second QoS profile | QoS flow establishment request list |
| | > QoS flow establishment request item of multicast service |
| | >> QFI |
| | >> QoS flow level and QoS parameter |
| | >> E-RAB identifier |
| | >> multicast service identifier |

2) The QoS profile includes a third QoS profile.

The core network device may transmit first indication information (also referred to as cast mode indication) to the access network device. The first indication information is used for indicating that the third QoS profile is used for transmitting the unicast service and/or the multicast service.

For example, the first indication information may be carried in the QoS profile.

In the implementation, the core network device configures only a group of QoS parameters which may be carried in the third QoS profile. The first indication information may take three values. The first indication information taking a first value indicates that the third QoS profile is only used for transmitting the unicast service. The first indication information taking a second value indicates that the third QoS profile is only used for transmitting the multicast service. The first indication information taking a third value indicates that the third QoS profile is used for transmitting both the multicast service and the unicast service.

In one example, in case that the third QoS profile is used for transmitting the multicast service, the third QoS profile further includes the service identifier of the multicast service.

As an example, the QoS profile is illustrated in Table 3. The QoS profile includes the third QoS profile. Parts in bold are newly added. In Table 3, the first indication information is used to indicate whether the third QoS profile is used for the unicast service only, the multicast service only, or both the unicast service and the multicast service. Similarly, only names of items in the QoS profile are listed in Table 3, and specific values of respective items are omitted. In case that a value of the first indication information indicates that the third QoS profile is used for the multicast service, the third QoS profile may include the service identifier of the multicast service.

TABLE 3

| Third QoS profile | QoS flow establishment request list |
|---|---|
| | > QoS flow establishment request item |
| | >> QFI |
| | >> QoS flow level and QoS parameter |
| | >> E-RAB identifier |
| | >> first indication information |
| | >> multicast service identifier |

It can be understood that the first indication information may not be carried in the QoS profile, but carried in a certain QoS parameter. For example, the first indication information is carried in the 5QI. In a 5QI table, a new column may be added to indicate whether the 5QI is used for transmitting the unicast service or the multicast service. For example, contents in a column corresponding to example services in the current 5QI table may not be changed and be used for the unicast service only. For another example, a new 5QI table may be used, and example services in the new 5QI table are used for the multicast service only. For yet another example, contents shared by the unicast service and the multicast service may be added in the example services in the current 5QI table.

Case 2

The unicast service and the multicast service are transmitted using different QoS flows in the PDU session.

In this case, the QoS profile may include a fourth QoS profile.

Additionally, the QoS profile further includes first indication information indicative of that the fourth QoS profile is used for transmitting the unicast service and/or the multicast service.

In this implementation, the core network device configures only a group of QoS parameters which may be carried in the fourth QoS profile. The first indication information may take three values. The first indication information taking a first value indicates that the fourth QoS profile is only used for transmitting the unicast service. The first indication information taking a second value indicates that the fourth QoS profile is only used for transmitting the multicast service. The first indication information taking a third value indicates that the fourth QoS profile is used for transmitting both the multicast service and the unicast service.

In one example, in case that the fourth QoS profile is used for transmitting the multicast service, the fourth QoS profile further includes a service identifier of the multicast service.

As an example, the QoS profile is illustrated in Table 4. The QoS profile includes the fourth QoS profile. In Table 4, the first indication information is used to indicate whether the fourth QoS profile is used for the unicast service only, the multicast service only, or both the unicast service and the multicast service. Similarly, only names of items in the QoS profile are listed in Table 4, and specific values of respective items are omitted. In case that a value of the first indication information indicates that the fourth QoS profile is used for the multicast service, the fourth QoS profile may include the service identifier of the multicast service.

TABLE 4

| Fourth QoS profile | QoS flow establishment request list |
|---|---|
| | > QoS flow establishment request item |
| | >> QFI |
| | >> QoS flow level and QoS parameter |
| | >> E-RAB identifier |
| | >> first indication information |
| | >> multicast service identifier |

By way of various manners described above, in case that the multicast service and the unicast service of the terminal device are transmitted through the same PDU session, the access network device may know whether a QoS flow used corresponds to the unicast service or the multicast service, such that service transmission between the access network device and the terminal device can be performed according to the QoS profile obtained, thereby ensuring the QoS requirements of the unicast service and the multicast service.

On arrival of downlink data at the UPF, the UPF may add second indication information in the target service. For example, the second indication information may be added in a packet header of the target service. The second indication information is used for indicating that whether the target service is the unicast service or the multicast service.

In case that the target service is the unicast service, the target service may be transmitted using the QoS profile corresponding to the unicast service, such as the above-described first QoS profile. In case that the target service is the multicast service, the target service may be transmitted using the QoS profile corresponding to the multicast service, such as the above-described second QoS profile.

Next, whether data from multiple PDU sessions is for a same service is determined according to the multicast service identifier in the QoS profile. If the data is for the same service, the data may be broadcast to the terminal device only once.

The access network device may determine to use unicast transmission or multicast transmission according to a user condition in a current cell, such as the number of users, user distribution, and the like, and may switch between the unicast transmission and the multicast transmission.

In case that the second indication information in the target service indicates that the target service is the unicast service, when the access network device determines to switch the target service from the unicast service to the multicast service, the access network device may transmit the target service using the QoS profile corresponding to the multicast service.

In this case, if the QoS profile received by the access network device cannot be used for the multicast service, the access network device may transmit a request message to the core network device, where the request message is used for requesting a QoS profile which can be used for transmitting the multicast service, and the request message includes a QFI corresponding to the multicast service. The access network device receives the request message and determines, according to a QoS parameter corresponding to the QFI, whether there is an existing QoS flow that can be used for transmitting the multicast service. If there is an existing QoS flow that can be used for transmitting the multicast service, the SMF may reply with a QFI of the QoS flow only. If there is no existing QoS flow that can be used for transmitting the multicast service, the SMF may reply with a new QoS profile that can be used for transmitting the multicast service.

Similarly, in case that the second indication information in the target service indicates that the target service is the multicast service, when the access network device determines to switch the target service from the multicast service to the unicast service, the access network device may transmit the target service using the QoS profile corresponding to the unicast service.

In this case, if the QoS profile received by the access network device cannot be used for the unicast service, the access network device may transmit a request message to the core network device, where the request message is used for requesting a QoS profile which can be used for transmitting the unicast service, and the request message includes a QFI corresponding to the unicast service. The access network device receives the request message and determines, according to a QoS parameter corresponding to the QFI, whether there is an existing QoS flow that can be used for transmitting the unicast service. If there is an existing QoS flow that can be used for transmitting the unicast service, the SMF may reply with a QFI of the QoS flow only. If there is no existing QoS flow that can be used for transmitting the unicast service, the SMF may reply with a new QoS profile that can be used for transmitting the unicast service.

In case that the access network device performs switch between unicast and multicast, the access network device may directly map the switch to a data radio bearer (DRB) without informing the core network, or may inquire the core network.

Figure 3:
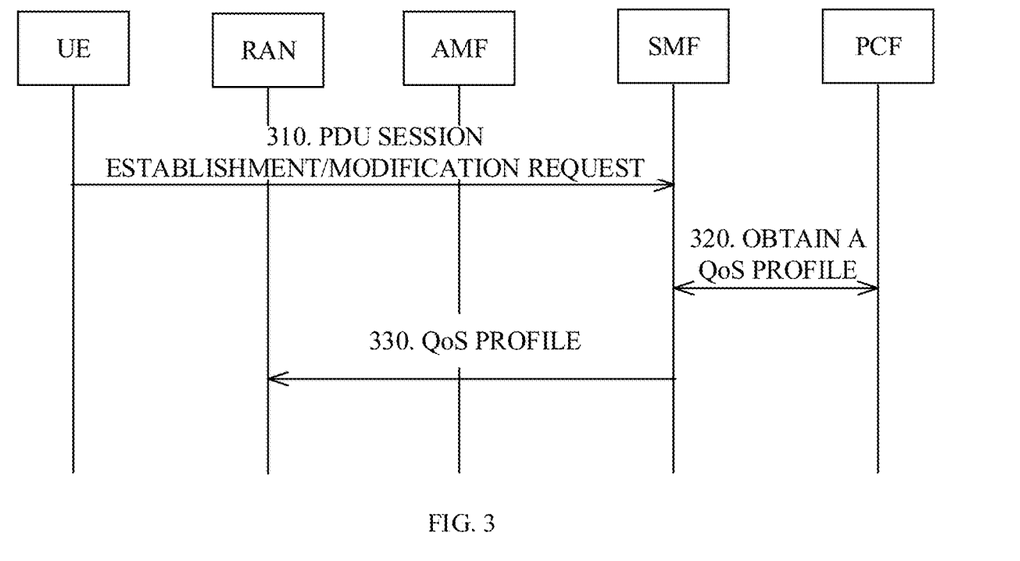
FIG. 3 is an interaction flow chart illustrating an implementation of the method illustrated in FIG. 2.

FIG. 3 is an interaction flow chart illustrating an implementation of the method illustrated in FIG. 2. As illustrated in FIG. 3, the method includes the following.

At 310, a terminal device transmits a PDU session establishment/modification request message to an SMF.

At 320, the SMF obtains, from a PCF, a QoS profile corresponding to a QoS flow.

At 330, the SMF transmits a session management message to a radio access network (RAN) device via an AMF, where the session management message carries the QoS profile.

Assume that second indication information in a target service received by the RAN indicates that the target service is a unicast service. If the QoS profile can be also used for a multicast service, for example, the QoS profile transmitted from the SMF to the RAN includes a first QoS profile and a second QoS profile, or, the QoS profile includes a third profile that can be used for transmitting unicast data and multicast data, then the RAN may transmit the multicast data using the corresponding QoS profile on condition that the RAN determines to switch the target service from unicast to multicast.

Figure 4:
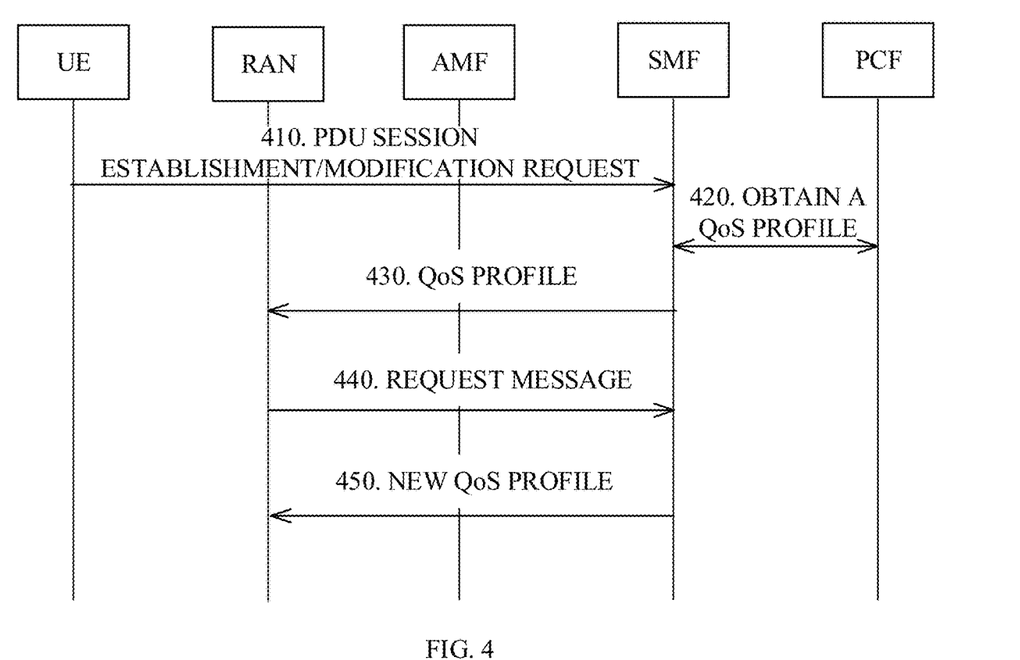
FIG. 4 is an interaction flow chart illustrating an implementation of the method illustrated in FIG. 2.

FIG. 4 is an interaction flow chart illustrating an implementation of the method illustrated in FIG. 2. As illustrated in FIG. 4, the method includes the following.

At 410, a terminal device transmits a PDU session establishment/modification request message to an SMF.

At 420, the SMF obtains, from a PCF, a QoS profile corresponding to a QoS flow.

At 430, the SMF transmits a session management message to an RAN via an AMF, where the session management message carries the QoS profile.

Assume that second indication information in a target service received by the RAN indicates that the target service is a unicast service. If the QoS profile can be used for a unicast service only, for example, the QoS profile transmitted from the SMF to the RAN includes a third profile that can be used for transmitting unicast data only, or, the QoS profile transmitted from the SMF to the RAN includes a fourth QoS profile that can be used for transmitting unicast data only, then the RAN perform operations at 440 and 450 on condition that the RAN determines to switch the target service from unicast to multicast.

At 440, the RAN transmits a request message to the SMF, where the request message carries a QFI corresponding to the multicast service.

At 450, the SMF transmits a new QoS profile to the RAN, that is, the QoS profile for transmitting the multicast service.

After obtaining the new QoS profile, the RAN may use the new QoS profile to transmit the multicast service to the terminal device.

It can be noted that, in case of no conflict, the various implementations and/or the technical features in each implementation described in the present disclosure can be combined with each other arbitrarily, and the technical solutions obtained after the combination may also fall within the protection scope of the present disclosure.

It can be understood that, in the various implementations of the present disclosure, the sequence number of each process does not mean the order of execution. The execution order of each process can be determined by its function and internal logic, and does not constitute any limitation to the implementation process of the implementations of the present disclosure.

The method for service transmission according to the implementations of the present disclosure is described in detail above. In the following, an apparatus for service transmission according to the implementations of the present disclosure will be described in conjunction with FIG. 5. Technical features described in the method implementations are applicable to the following apparatus implementations.

It can be understood that, in order to implement the above-mentioned functions, the apparatus includes hardware structures and/or software modules used to perform respective functions. Those skilled in the art can easily realize that, in combination with units and algorithm steps of examples described in the implementations disclosed herein, the implementations of the present disclosure can be implemented in the form of hardware or a combination of hardware and computer software. Whether a certain function is executed by hardware or computer-software driving hardware depends on a specific application and design constraint conditions of the technical solution. Professionals and technicians can use different methods for each specific application to implement the described functions, but such implementation cannot be considered beyond the scope of the present disclosure.

In the implementations of the present disclosure, the apparatus can be divided into functional units according to the above method implementations. For example, each function may correspond to a functional unit, or two or more functions can be integrated in one processing unit. The integrated unit can be implemented in the form of hardware or a software functional unit. It can be noted that the division of units in the implementations of the present disclosure is illustrative, and is only a logical function division, and there may be other division in practices.

Figure 5:
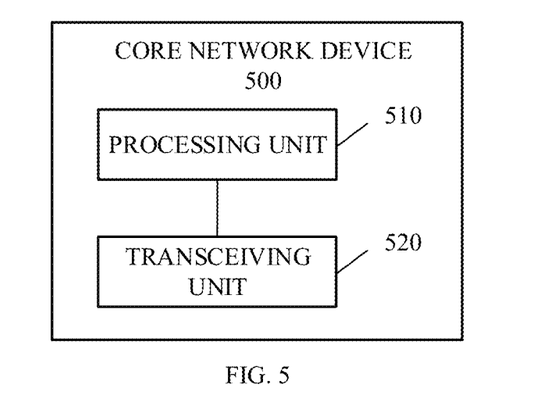
FIG. 5 is a schematic block diagram illustrating a core network device according to implementations of the present disclosure.

FIG. 5 is a schematic block diagram illustrating a core network device 500 according to implementations of the present disclosure. As illustrated in FIG. 5, the core network device 500 includes a processing unit 510 and a transceiving unit 520.

The processing unit 510 is configured to obtain a QoS profile for transmitting a unicast service and/or a multicast service, where the unicast service and the multicast service are transmitted through a same PDU session.

The transceiving unit 520 is configured to transmit the QoS profile to an access network device, where the QoS profile is used for the access network device to transmit a target service.

Therefore, in case that the unicast service and the multicast service of a terminal device can be transmitted through the same PDU session, the core network device can configure the QoS profile for transmitting the unicast service and/or the multicast service and transmit the QoS profile to the access network device, so that the access network device can effectively perform service transmission and ensure QoS requirements of the unicast service and the multicast service transmitted.

In some implementations, the unicast service and the multicast service are transmitted using a same QoS flow in the PDU session.

In some implementations, the QoS profile includes a first QoS profile and a second QoS profile, where the first QoS profile is used for transmitting the unicast service, and the second QoS profile is used for transmitting the multicast service.

In some implementations, the first QoS profile includes unicast indication information indicative of that the first QoS profile is used for transmitting the unicast service, and the second QoS profile includes multicast indication information indicative of that the second QoS profile is used for transmitting the multicast service.

In some implementations, the first QoS profile has a name different from a name of the second QoS profile.

In some implementations, the second QoS profile further includes a service identifier of the multicast service.

In some implementations, the first QoS profile includes multiple parameters each with a parameter value the same as or close to a parameter value of a same parameter in the second QoS profile.

In some implementations, the QoS profile includes a third QoS profile and first indication information indicative of that the third QoS profile is used for transmitting the unicast service and/or the multicast service.

In some implementations, the third QoS profile further includes a service identifier of the multicast service on condition that the third QoS profile is used for transmitting the multicast service.

In some implementations, the unicast service and the multicast service are transmitted using different QoS flows in the PDU session.

In some implementations, the QoS profile includes a fourth QoS profile and first indication information indicative of that the fourth QoS profile is used for transmitting the unicast service and/or the multicast service.

In some implementations, the fourth QoS profile further includes the service identifier of the multicast service on condition that the fourth QoS profile is used for transmitting the multicast service.

In some implementations, the core network device is an SMF, and the processing unit 510 is configured to obtain the QoS profile according to local configuration, or obtain the QoS profile from a PCF through the transceiving unit 520.

In some implementations, data of the target service includes second indication information indicative of that the target service is the unicast service or the multicast service.

In some implementations, the QoS profile is not used for transmitting the multicast service, and the transceiving unit 520 is further configured to receive, when the access network device switches the target service from the unicast service to the multicast service, a request message from the access network device, and transmit, to the access network device, the QoS profile for transmitting the multicast service according to the request message, where the request message is used for requesting a QoS profile for transmitting the multicast service, and the request message includes a QFI corresponding to the multicast service.

In some implementations, the QoS profile is not used for transmitting the unicast service, and the transceiving unit 520 is further configured to receive, when the access network device switches the target service from the multicast service to the unicast service, a request message from the access network device, and transmit, to the access network device, the QoS profile for transmitting the unicast service according to the request message, where the request message is used for requesting a QoS profile for transmitting the unicast service, and the request message includes a QFI corresponding to the unicast service.

For the specific manner in which the core network device 500 performs service transmission and the beneficial effects produced, reference may be made to the related description in the method implementations.

Figure 6:
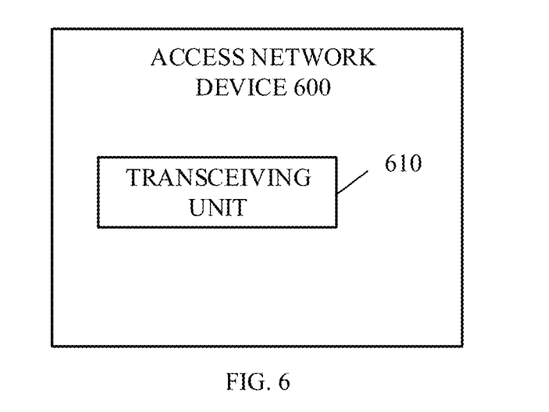
FIG. 6 is a schematic block diagram illustrating an access network device according to implementations of the present disclosure.

FIG. 6 is a schematic block diagram illustrating an access network device 600 according to implementations of the present disclosure. As illustrated in FIG. 6, the access network device 600 includes a transceiving unit 610.

The transceiving unit 610 is configured to receive, from a core network device, a QoS profile for transmitting a unicast service and/or a multicast service, where the unicast service and the multicast service are transmitted through a same PDU session. The transceiving unit 610 is further configured to transmit a target service according to the QoS profile.

Therefore, in case that the unicast service and the multicast service of a terminal device can be transmitted through the same PDU session, the core network device can configure the QoS profile for transmitting the unicast service and the multicast service and transmit the QoS profile to the access network device, so that the access network device can effectively perform service transmission and ensure QoS requirements of the unicast service and the multicast service transmitted.

In some implementations, the unicast service and the multicast service are transmitted using a same QoS flow in the PDU session.

In some implementations, the QoS profile includes a first QoS profile and a second QoS profile, where the first QoS profile is used for transmitting the unicast service and the second QoS profile is used for transmitting the multicast service.

In some implementations, the first QoS profile includes unicast indication information indicative of that the first QoS profile is used for transmitting the unicast service, and the second QoS profile includes multicast indication information indicative of that the second QoS profile is used for transmitting the multicast service.

In some implementations, the first QoS profile has a name different from a name of the second QoS profile.

In some implementations, the second QoS profile further includes a service identifier of the multicast service.

In some implementations, the first QoS profile includes multiple parameters each with a parameter value the same as or close to a parameter value of a same parameter in the second QoS profile.

In some implementations, the QoS profile includes a third QoS profile and first indication information indicative of that the third QoS profile is used for transmitting the unicast service and/or the multicast service.

In some implementations, the third QoS profile further includes the service identifier of the multicast service on condition that the third QoS profile is used for transmitting the multicast service.

In some implementations, the unicast service and the multicast service are transmitted using different QoS flows in the PDU session.

In some implementations, the QoS profile includes a fourth QoS profile and first indication information indicative of that the fourth QoS profile is used for transmitting the unicast service and/or the multicast service.

In some implementations, the fourth QoS profile further includes the service identifier of the multicast service on condition that the fourth QoS profile is used for transmitting the multicast service.

In some implementations, data of the target service includes second indication information indicative of that the target service is the unicast service or the multicast service.

In some implementations, the QoS profile is not used for transmitting the multicast service, and the transceiving unit 610 is further configured to transmit, when the access network device switches the target service from the unicast service to the multicast service, a request message to the core network device, and receive, from the core network device, the QoS profile for transmitting the multicast service according to the request message, where the request message is used for requesting a QoS profile for transmitting the multicast service, and the request message includes a QFI corresponding to the multicast service.

In some implementations, the QoS profile is not used for transmitting the unicast service, and the transceiving unit 610 is further configured to transmit, when the access network device switches the target service from the multicast service to the unicast service, a request message to the core network device, and receive, from the core network device, the QoS profile for transmitting the unicast service, where the request message is used for requesting a QoS profile for transmitting the unicast service, and the request message includes a QFI corresponding to the unicast service.

It can be understood that for the specific manner in which the access network device 600 performs service transmission and the beneficial effects produced, reference may be made to the related description in the method implementations.

Figure 7:
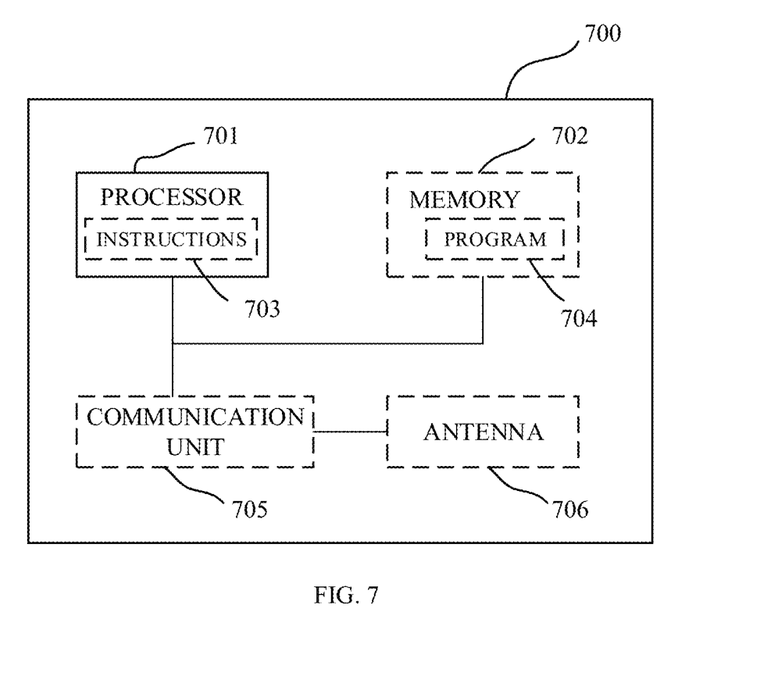
FIG. 7 is s schematic structural diagram illustrating a device for service transmission according to implementations of the present disclosure.

FIG. 7 is a schematic structural diagram illustrating a device 700 for service transmission according to implementations of the present disclosure. In FIG. 7, a unit or module indicated via dotted lines may be optional. The device 700 may be used to implement the methods described in the foregoing method implementations. The device 700 may be an access network device, a core network device, or a chip.

The device 700 includes one or more processors 701. The one or more processors 701 can enable the device 700 to implement the methods in the method implementations corresponding to FIGS. 2 to 4. The processor 701 may be a general-purpose processor or a special-purpose processor. For example, the processor 701 may be a central processing unit (CPU). The CPU may be configured to control the device 700 to execute a software program and process data of the software program. The device 700 may further include a communication unit 705 to implement signal input (reception) and output (transmission).

For example, the device 700 may be a chip. The communication unit 705 may be an input and/or output circuit of the chip. Alternatively, the communication unit 705 may be a communication interface of the chip. The chip may be used as a component of the access network device or the core network device or other wireless communication devices.

For another example, the device 700 may be the access network device or the core network device. The communication unit 705 may be a transceiver of the access network device or the core network device. Alternatively, the communication unit 705 may be a transceiving circuit of the access network device or the core network device.

The device 700 may include one or more memories 702 storing a program 704. The program 704 can be run by the processor 701 to generate instructions 703 which cause the processor 701 to execute the method described in the foregoing method implementations. In one example, the memory 702 may also store data. In one example, the processor 701 may also read data stored in the memory 702. The data may be stored at a same storage address as the program 704, or the data may be stored at a different storage address from the program 704.

The processor 701 and the memory 702 may be provided separately or integrated together, for example, integrated on a system on chip (SOC) of the access network device or the core network device.

The device 700 may also include an antenna 706. The communication unit 705 is configured to implement a transceiving function of the device 700 through the antenna 706.

For the specific manner in which the processor 701 executes the communication method, reference may be made to the related description in the method implementations.

It can be understood that each operation in the foregoing method implementations may be completed by a logic circuit in the form of hardware or instructions in the form of software in the processor 701. The processor 701 may be a CPU, a digital signal processor (DSP), an application specific integrated circuit (ASIC), a field programmable gate array (FPGA), or other programmable logic devices, such as discrete gates, transistor logic devices, or discrete hardware components.

The implementations of the present disclosure also provide a computer program product which, when executed by the processor 701, implements the method described in any method implementations in the present disclosure.

The computer program product may be stored in the memory 702. For example, the computer program product may be the program 704. The program 704 is finally converted into an executable object file through processes such as preprocessing, compilation, assembly, and linking and the executable object file can be executed by the processor 701.

The implementations of the present disclosure also provide a computer-readable storage medium storing a computer program. When the computer program is executed by a computer, the method described in any method implementation in the present disclosure is implemented. The computer program may be a high-level language program or an executable target program.

The computer-readable storage medium is, for example, the memory 702. The memory 702 may be a volatile memory or a non-volatile memory, or the memory 702 may include both a volatile memory and a non-volatile memory. The non-volatile memory can be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), which is used as external cache. By way of exemplary but not restrictive description, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced synchronous dynamic random access memory (enhanced SDRAM, ESDRAM), a synchronous connection dynamic random access memory (synchlink DRAM, SLDRAM)), and a direct rambus RAM (DR RAM).

Those skilled in the art can clearly understand that, for the convenience and conciseness of description, for specific work processes of the apparatus and device and technical effects produced, reference can be made to the corresponding process and technical effects in the foregoing method implementations, which will not be repeated herein.

In the several implementations provided in this disclosure, the disclosed system, apparatus, and method can be implemented in other ways. For example, some features in the method implementations described above may be ignored or not implemented. The apparatus implementations described above are merely illustrative. The division of units is only a logical function division. In actual implementation, there may be other division methods, and multiple units or components may be combined or integrated into another system. In addition, the coupling between various units or the coupling between various components may be direct coupling or indirect coupling, and the foregoing coupling includes electrical, mechanical, or other forms of connection.

In addition, the terms "system" and "network" in this disclosure are often used interchangeably. The term "and/or" in this disclosure is only an association relationship that describes associated objects, indicating that there can be three relationships, for example, A and/or B, which can mean: A alone exists, A and B both exist, and B alone exists. In addition, the character "/" in the present disclosure generally indicates that the associated objects before and after the character "/" are in an "or" relationship.

In the implementations of the present disclosure, "B corresponding to A" means that B is associated with A, and B can be determined according to A. However, "B is determined according to A" does not mean that B is determined according to A only, and B may also be determined according to A and/or other information.

In short, the above descriptions are only some implementations of the technical solutions of the present disclosure, and are not used to limit the protection scope of the present disclosure. Any modification, equivalent replacement, improvement, and the like made within the spirit and principle of this disclosure shall be included in the protection scope of the present disclosure.

What is claimed is:

1. A method for service transmission, comprising: obtaining, by a core network device, a quality of service (QOS) profile; and transmitting, by the core network device, the QoS profile to an access network device, the QoS profile being used for the access network device to transmit a target service; wherein the QoS profile comprises a first QoS profile and a second QoS profile, wherein the first QoS profile is used for transmitting a unicast service, and the second QoS profile is used for transmitting a multicast service, wherein the unicast service and the multicast service are transmitted using a same QoS flow in a protocol data unit (PDU) session.

2. The method of claim 1, wherein the second QoS profile comprises a service identifier of the multicast service.

3. The method of claim 1, wherein:
the first QoS profile comprises unicast indication information indicative of that the first QoS profile is used for transmitting the unicast service; and
the second QoS profile comprises multicast indication information indicative of that the second QoS profile is used for transmitting the multicast service.

4. The method of claim 1, wherein the first QoS profile has a name different from a name of the second QoS profile.

5. The method of claim 1, wherein the first QoS profile comprises a plurality of parameters each with a parameter value the same as or close to a parameter value of a same parameter in the second QoS profile.

6. The method of claim 1, wherein the core network device is a session management function (SMF), and obtaining, by the core network device, the QoS profile comprises:
obtaining, by the SMF, the QoS profile according to local configuration; or
obtaining, by the SMF, the QoS profile from a policy control function (PCF).

7. The method of claim 1, wherein data of the target service comprises second indication information indicative of that the target service is the unicast service or the multicast service.

8. A method for service transmission, comprising: receiving, by an access network device, a quality of service (QOS) profile from a core network device; and transmitting, by the access network device, a target service according to the QoS profile; wherein the QoS profile comprises a first QoS profile and a second QoS profile, wherein the first QoS profile is used for transmitting a unicast service, and the second QoS profile is used for transmitting a multicast service, wherein the unicast service and the multicast service are transmitted using a same QoS flow in a protocol data unit (PDU) session.

9. The method of claim 8, wherein the second QoS profile comprises a service identifier of the multicast service.

10. The method of claim 8, wherein:
the first QoS profile comprises unicast indication information indicative of that the first QoS profile is used for transmitting the unicast service; and
the second QoS profile comprises multicast indication information indicative of that the second QoS profile is used for transmitting the multicast service.

11. The method of claim 8, wherein the first QoS profile has a name different from a name of the second QoS profile.

12. The method of claim 8, wherein the first QoS profile comprises a plurality of parameters each with a parameter value the same as or close to a parameter value of a same parameter in the second QoS profile.

13. The method of claim 8, wherein data of the target service comprises second indication information indicative of that the target service is the unicast service or the multicast service.

14. A core network device, comprising: a transceiver; a processor; and a memory storing a computer program which, when executed by the processor, causes the processor to: obtain a quality of service (QOS) profile; wherein the computer program, when executed by the processor, causes the transceiver to: transmit the QoS profile to an access network device, the QoS profile being used for the access network device to transmit a target service, wherein the QoS profile comprises a first QoS profile and a second QoS profile, wherein the first QoS profile is used for transmitting a unicast service, and the second QoS profile is used for transmitting a multicast service, wherein the unicast service and the multicast service are transmitted using a same QoS flow in a protocol data unit (PDU) session.

15. The core network device of claim 14, wherein the second QoS profile comprises a service identifier of the multicast service.

16. The core network device of claim 14, wherein:
the first QoS profile comprises unicast indication information indicative of that the first QoS profile is used for transmitting the unicast service; and the second QoS profile comprises multicast indication information indicative of that the second QoS profile is used for transmitting the multicast service.

17. The core network device of claim 14, wherein the first QoS profile has a name different from a name of the second QoS profile.

18. The core network device of claim 14, wherein the first QoS profile comprises a plurality of parameters each with a parameter value the same as or close to a parameter value of a same parameter in the second QoS profile.

19. An access network device, comprising: a transceiver; a processor; and a memory storing a computer program which, when executed by the processor, causes the transceiver to: receive, from a core network device, a quality of service (QOS) profile; and transmit a target service according to the QoS profile, wherein the QoS profile comprises a first QoS profile and a second QoS profile, wherein the first QoS profile is used for transmitting a unicast service, and the second QoS profile is used for transmitting a multicast service, wherein the unicast service and the multicast service are transmitted using a same QoS flow in a protocol data unit (PDU) session.

20. The access network device of claim 19, wherein the second QoS profile comprises a service identifier of the multicast service.

* * * * *